(12) United States Patent
Bennett et al.

(10) Patent No.: US 6,459,963 B1
(45) Date of Patent: Oct. 1, 2002

(54) METHODS AND APPARATUS FOR TRIMMING ENGINE CONTROL SYSTEMS

(75) Inventors: George Washington Bennett, Cincinnati; Sridhar Adibhatla, West Chester; Matthew William Wiseman, Fairfield, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/629,529

(22) Filed: Jul. 31, 2000

(51) Int. Cl.$^7$ .................................................. G06F 7/00
(52) U.S. Cl. ............................................... 701/3; 701/14
(58) Field of Search ................................ 701/3, 14, 99, 701/100, 103, 104, 110, 115; 73/117.3; 60/204, 242, 39.03, 39.06

(56) References Cited

U.S. PATENT DOCUMENTS

| | | | |
|---|---|---|---|
| 3,721,120 A | * 3/1973 | Howell et al. | 73/117.3 |
| 3,750,465 A | * 8/1973 | Howell et al. | 73/117.3 |
| 5,267,435 A | * 12/1993 | Frenkel et al. | 60/204 |
| 5,303,541 A | * 4/1994 | Goff et al. | 60/39.03 |
| 5,465,570 A | 11/1995 | Szillat et al. | |
| 5,598,698 A | 2/1997 | Szillat et al. | |
| 5,694,766 A | 12/1997 | Smereczniak et al. | |
| 5,838,588 A | 11/1998 | Santoso et al. | |
| 6,250,877 B1 | 6/2001 | Westphal et al. | |

* cited by examiner

*Primary Examiner*—William A. Cuchlinski, Jr.
*Assistant Examiner*—Edward Pipala
(74) *Attorney, Agent, or Firm*—Nathan D. Herkamp; Armstrong Teasdale LLP

(57) ABSTRACT

A control system trims a gas turbine engine in real-time to provide a desired amount of thrust. The control system includes a controller coupled to the engine for receiving inputs from the engine regarding a status of the engine. The controller includes a processor and a non-volatile memory coupled to the processor. The processor is programmed to execute control logic. An engine power schedule representing values for a controlled variable is stored in the memory.

17 Claims, 2 Drawing Sheets

METHODS AND APPARATUS FOR TRIMMING ENGINE CONTROL SYSTEMS

BACKGROUND OF THE INVENTION

This application relates generally to gas turbine engines and, more particularly, to control systems for gas turbine engine.

Because an amount of thrust produced by an aircraft engine can not be measured in flight, gas turbine engines typically use control systems that indirectly control thrust by controlling engine fan speed or engine pressure ratio. Specifically, such control systems infer engine thrust from parameters that can be measured, such as a rotational speed of a fan or a ratio of nozzle inlet pressure to fan inlet pressure. The measured parameters are compared to power management schedules preloaded into the control systems.

To account for engine-to-engine manufacturing quality variations, deterioration of engine components over time, control sensor measurement errors, and changes in operating conditions, such as humidity, the control systems typically preset each control parameter within the power management schedule at a higher value than is actually needed. As a result, actual thrust produced is at least equal to, but usually higher than, an amount of engine thrust desired.

Because the aircraft engines are not trimmed in real-time, the control systems are pre-programmed to produce a minimum amount of thrust from even a deteriorated engine. Accordingly, engines that have not deteriorated produce more thrust than necessary for a given set of operating parameters. The additional thrust causes the engines to operate with increased operating temperatures. Furthermore, because the schedules do not change with time or in response to specific engine characteristics, such engines may never be trimmmed to produce an optimal desired thrust. Over time, continued operation of the engine at increased temperatures may shorten engine life, increase operating costs, and limit user flexibility in selecting operating ranges for the engine.

BRIEF SUMMARY OF THE INVENTION

In an exemplary embodiment, a control system trims a gas turbine engine in real-time to provide a desired amount of thrust. The control system includes a controller coupled to the engine for receiving inputs from the engine regarding a status of the engine. The controller includes a processor and a memory coupled to the processor. The processor is programmed to execute control logic. An engine power schedule representing values for a controlled variable is stored in the memory.

During operation, the processor uses the engine inputs to determine a commanded fuel flow that corresponds to an amount of thrust desired. Because the control system trims the engine in real-time and does not control the engine using fixed schedules that do not change in response to changing operating characteristics of the engine, on-wing engine life for the engine is increased. Furthermore, because the engine is trimmed in real-time and is not trimmed using schedules that result in producing more thrust than necessary, excess thrust of the engine is reduced and the engine operates with lower operating temperatures, lower operating costs, and more reliability.

DETAILED DESCRIPTION OF THE INVENTION

Figure 1:
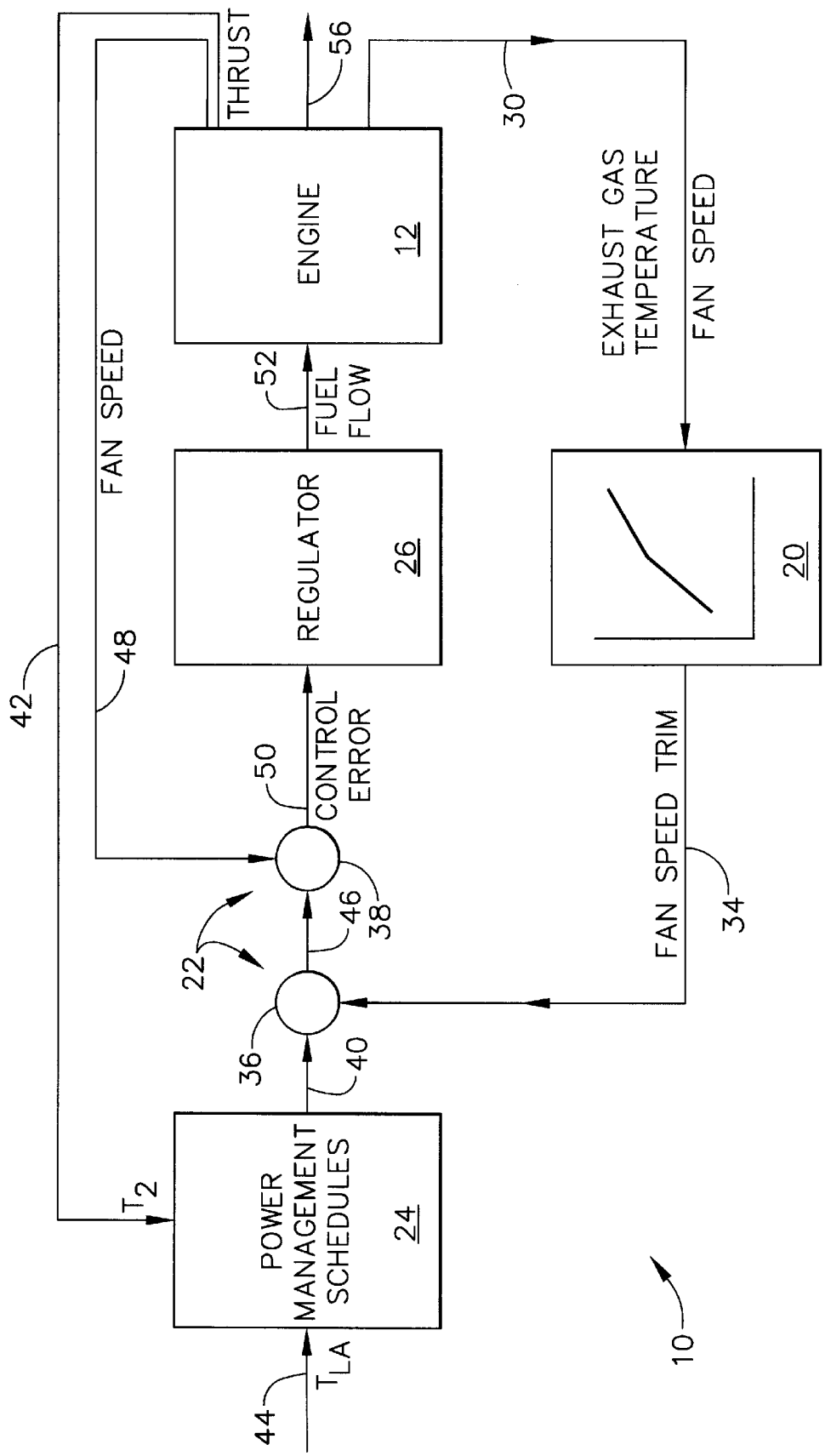
FIG. 1 is a logic diagram of a control system for use with an aircraft engine.

FIG. 1 is a logic diagram of a control system 10 for use with an aircraft engine 12. Control system 10 includes a fan speed trim estimation unit 20, a plurality of summing junctions 22, a power management schedule memory 24, and a regulator unit 26. Power management schedule memory 24 and regulator unit 26 are known in the art. Trim estimation unit 20 receives inputs 30 from engine 12 and applies inputs 30 to a thrust-vs.-fan speed schedule (not shown) to produce a steady-state power management parameter trim value 34. In one embodiment, inputs 30 are measured values of exhaust gas temperature, EGT and a power management feedback parameter.

Summing junctions 22 include a first summing junction 36 and a second summing junction 38. Second summing junction 38 is well known in the art. First summing junction 36 sums a power management parameter reference value 40 from power management schedule memory 24. Power management schedule 24 includes a table of values of power management parameter references 40 as a function of thrust demand. Thrust demand is determined from throttle lever angle (TLA) 44 and values 42 received from engine sensors that are indicative of flight conditions. In one embodiment, values 42 include fan inlet temperature (T2). Summing junction 36 sums reference parameter value 40 and reference parameter trim value 34 to produce a modified reference parameter value 46.

Second summing junction 38 subtracts feedback parameter value 48 provided by engine 12 from modified reference parameter value 46 to produce control error 50. In one embodiment, power management parameter reference 40 is a reference fan speed, power management parameter trim value 34 is fan speed trim, feedback parameter value 48 is sensed fan speed, modified reference parameter value 46 is modified reference fan speed, and control error 50 is fan speed error. In another embodiment, power management parameter reference 40 is a reference engine pressure ratio, power management parameter trim value 34 is engine pressure ratio trim, feedback parameter value 48 is sensed engine pressure ratio, modified reference parameter value 46 is modified reference engine pressure ratio, and control error 50 is engine pressure ratio error.

Control error 50 generated by second summing junction 38 is supplied to regulator unit 26. Regulator unit 26 produces a commanded fuel flow output 52 based on a combination of information pre-programmed into regulator unit 26 and error 50. Commanded fuel flow output 52 is provided to engine 12 to produce a desired thrust 56 based on throttle lever angle 44 and values 42 received from engine sensors, feedback parameter value 48, and engine value 30. In one embodiment, value 42 is fan inlet temperature, feedback parameter value 48 is sensed fan speed, and engine value 30 is sensed exhaust gas temperature.

Trim estimation unit 20 uses input values 30 indicative of engine condition and engine power levels to compute power management trim value 34. In one embodiment, engine values 30 include exhaust gas temperature and fan speed. Trim estimation unit 20 also includes logic to account for engine dynamics and to ensure that modifications to trim value 34 are made at steady-state conditions. In one embodiment, trim estimation unit 20 consists of a lookup table and steady-state detection logic. In another embodiment, trim estimation unit 20 uses curve-fits or physics models to obtain trim value 34 as a function of engine condition and power level. In a further embodiment, trim estimation unit 20 and first summing junction 36 are implemented in a non-volatile memory unit coupled to a processor that implements power management schedule memory 24, regulator unit 26, and summing junction 38.

As engine 12 deteriorates over time, engine values 30 indicating sensed exhaust gas temperature 30 changes in response. Because control system 10 trims engine using fan speed trim value 34 and is not controlled based on fixed power management schedules 24 that do not change with time or in response to operating conditions of engine 12, on-wing engine life for engine 12 is increased. Furthermore, because engine 12 is trimmed in real-time and is not trimmed based on schedules that are designed to produce more thrust than necessary, excess thrust from engine 12 is reduced and engine 12 operates with lower operating temperatures.

Figure 2:
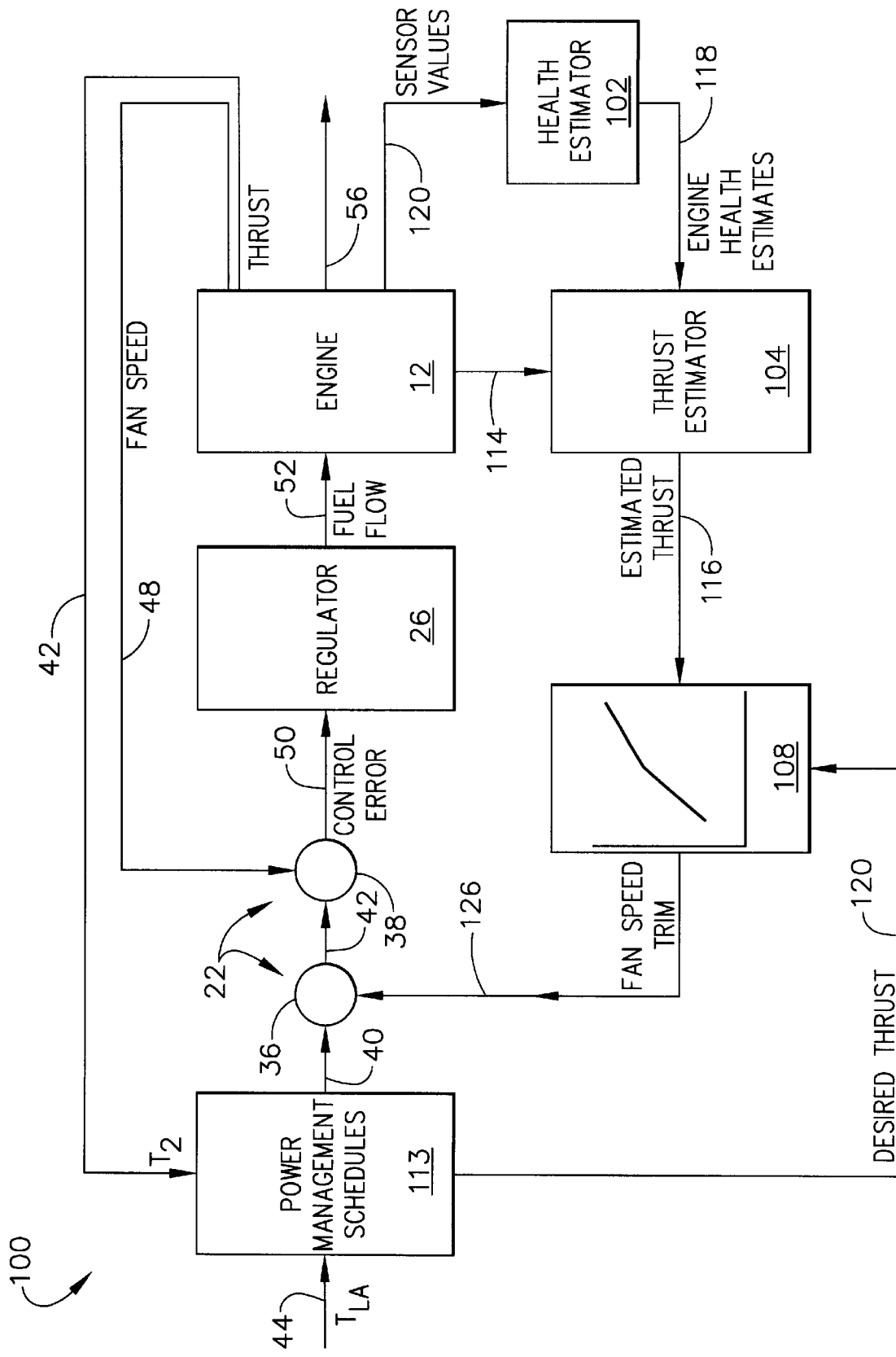
FIG. 2 is a logic diagram of an alternative embodiment of a control system for use with an aircraft engine.

FIG. 2 is a logic diagram of an alternative embodiment of a control system 100 for use with aircraft engine 12. Components in control system 100 that are identical to components of control system 10 (shown in FIG. 1) are identified in FIG. 2 using the same reference numerals used in FIG. 1. Accordingly, control system 100 includes regulator unit 26 and summing junction 36. Control system 100 also includes an engine quality estimation unit 102, a thrust estimation unit 104, a fan speed trim estimation unit 108 that is substantially similar to fan speed trim estimation unit 20 (shown in FIG. 1), and a power management schedule 113 that is substantially similar to power management schedule 24 (shown in FIG. 1). In an alternative embodiment, control system 100 does not include engine quality estimation unit 102.

Thrust estimation unit 104 uses sensor values 114 from engine 12 to determine an estimated thrust 116. In one embodiment, sensor values 114 are measured values for pressures, temperatures, and/or rotor speeds. In another embodiment, thrust estimation unit 104 uses a table-lookup scheme to determine estimated thrust 116. In yet another embodiment, thrust estimation unit 104 uses a regressor to determine estimated thrust 116. In a further embodiment, thrust estimation unit 104 uses a neural network model to determine estimated thrust 116. In still a further embodiment, thrust estimation unit 104 uses a physics-based model to determine estimated thrust 116. In yet another embodiment, thrust estimation unit 104 uses engine quality estimates 118 computed by estimation unit 102.

Estimation unit 102 uses sensor values 120 from engine 12 to produce engine quality estimates 118 indicative of engine component health. In one embodiment, sensor values 110 are measured values for temperatures, pressures, and rotor speeds. In another embodiment, estimation unit 102 uses a regression matrix to generate engine quality estimates 118. In yet another embodiment, estimation unit 102 uses a Kalman filter to generate engine quality estimates 118. In a further embodiment, estimation unit 102 uses a neural network to generate engine quality estimates.

Power management schedule 113 is substantially similar power management schedule 24 and includes the functionality included in power management schedule 24. Power management schedule 113 also provides a value for desired thrust 120. In one embodiment, desired thrust 120 is computed from throttle lever angle 44 and values 42 received from engine sensors that are indicative of flight conditions.

Trim estimation unit 108 receives estimated thrust 116 provided by thrust estimation unit 104 and desired thrust 120 provided by power management schedules 113 to produce a power management parameter trim value 126. Similarly to trim estimation unit 20, power management trim value 126 is updated each time engine thrust from engine 12 reaches a steady-state value. In one embodiment, power management parameter value 40 is a reference fan speed, parameter trim value 126 is a fan speed trim value, feedback input parameter value 48 is a sensed fan speed, modified reference parameter 46 is a modified reference fan speed, and control error 50 is a fan speed error.

Control error 50 generated by second summing junction 38 is supplied to regulator unit 26. Regulator unit 26 produces commanded fuel flow 52 based on a combination of information pre-programmed into regulator unit 26 and provided by control error 50. Commanded fuel flow 52 is provided to engine 12 to produce desired thrust 56 based on throttle lever angle 44, a fan inlet temperature value 42, a sensed fan speed value 48, and sensed values of pressures, temperatures, and/or rotor speeds provided by sensor values 114 and 120.

In one embodiment, estimation units 102, 104, and 108, and summing junction 36 are implemented in a non-volatile memory unit coupled to a processor that implements power management schedule memory 130, regulator unit 26, and summing junction 38.

As engine 12 deteriorates over time, sensor values 114 and 120 change in response. Because control system 100 trims engine using fan speed trim value 126 and is not controlled based on fixed power management schedules 130 that do not change with time or in response to operating conditions of engine 12, on-wing engine life for engine 12 is increased. Furthermore, because engine 12 is trimmed in realtime and is not trimmed based on schedules that are designed to produce more thrust than necessary, excess thrust from engine 12 is reduced and engine 12 operates with lower operating temperatures.

The above-described control system for a gas turbine engine is cost-effective and reliable. The control system includes a processor coupled to the engine to receive real-time inputs from the engine. Based on the real-time inputs, the control system is capable of trimming the engine to produce a desired amount of engine thrust. As a result of the control system trimming the engine in real-time, on-wing life for the engine is increased, operating costs for the engine are lowered, and the engine operates with lower operating temperatures.

While the invention has been described in terms of various specific embodiments, those skilled in the art will recognize that the invention can be practiced with modification within the spirit and scope of the claims.

What is claimed is:

1. A method for controlling an aircraft engine using a control system, the control system including a processor coupled to the aircraft engine, said method comprising the steps of;

receiving a throttle command from the aircraft;

determining a reference value for a controlled variable from an engine power schedule;

generating a trim output based for the reference value based on current engine conditions;

adding the trim to the reference value to obtain a modified reference value;

comparing the modified reference value to a feedback value; and determining a commanded fuel flow for a corresponding amount of thrust in response to the controlled variable.

2. A method in accordance with claim 1 wherein said step of generating a trim output further comprises the step of receiving engine sensor values used to generate the trim.

3. A method in accordance with claim 2 wherein said step receiving engine sensor values further comprises the steps of:
  receiving an engine sensor value representing an exhaust gas temperature of the engine; and
  receiving an engine sensor value representing a fan speed of the engine.

4. A method in accordance with claim 3 wherein said step of generating a trim output further comprises the step of using steady-state detection logic and at least one of a look-up table, a curve fit, and a physics model to generate the trim.

5. A method in accordance with claim 1 wherein said step of generating a trim output further comprises the steps of:
  receiving a thrust demand value;
  receiving a thrust estimate value; and
  generating a trim in response to the thrust demand value and the thrust estimate value.

6. A control system for controlling an aircraft engine, said control system coupled to the aircraft engine for receiving a reference input from engine sensors coupled to the engine, said control system comprising a schedule memory storing an engine power schedule representing reference values for a controlled variable, said control system configured to generate a trim output for a reference value, said control system further configured to add the trim output to an engine power schedule reference value to produce a commanded fuel flow for a corresponding amount of thrust in response to the controlled variable and the engine sensor values.

7. A control system in accordance with claim 6 wherein said control system further configured to generate a trim output in response to the reference inputs received from the engine.

8. A control system in accordance with claim 6 wherein said control system further configured to use at least one of a lookup table, a curve-fit, and a physics model to generate the trim output.

9. A control system in accordance with claim 6 wherein said control system further comprises an estimator unit configured to receive health estimates of engine component health.

10. A control system in accordance with claim 9 wherein said control system further configured to use at least one of a regression matrix, a Kalman filter, and a neural network to receive health estimates of engine component health.

11. A control system in accordance with claim 10 wherein said control system further configured to receive exhaust gas temperature and fan speed values from the engine.

12. An aircraft engine trim system, said system coupled to the aircraft engine to receive reference inputs from the engine to determine a state of the aircraft engine, said system configured to generate a trim output in response to a thrust demand value and a thrust estimate value, said system comprising a schedule memory for storing an engine power schedule representing reference values for a controlled variable.

13. An aircraft engine trim system in accordance with claim 12 wherein said system further configured to determine a commanded fuel flow for a corresponding amount of thrust in response to the trim output using the reference inputs provided by the aircraft engine and a reference value provided by said schedule memory.

14. An aircraft engine trim system in accordance with claim 13 wherein said system further configured to use at least one of a lookup table, a curve-fit, and a physics model to generate the trim output.

15. An aircraft engine trim system in accordance with claim 12 wherein said system further configured to receive an engine throttle lever angle.

16. An aircraft engine trim system in accordance with claim 12 wherein control system further configured to receive health estimates of engine component health.

17. An aircraft engine trim system in accordance with claim 16 wherein said control system further configured to use at least one of a regression matrix, a Kalman filter, and a neural network to receive health estimates of engine component health.

* * * * *